United States Patent
Tran et al.

(10) Patent No.: US 10,366,313 B2
(45) Date of Patent: *Jul. 30, 2019

(54) ACTIVATION LAYERS FOR DEEP LEARNING NETWORKS

(71) Applicant: A9.com, Inc., Palo Alto, CA (US)

(72) Inventors: Son Dinh Tran, Sunnyvale, CA (US); Raghavan Manmatha, San Francisco, CA (US)

(73) Assignee: A9.COM, INC., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/894,867

(22) Filed: Feb. 12, 2018

(65) Prior Publication Data

US 2018/0197049 A1    Jul. 12, 2018

Related U.S. Application Data (63) Continuation of application No. 14/954,646, filed on Nov. 30, 2015, now Pat. No. 9,892,344.

(51) Int. Cl.
*G06K 9/66* (2006.01)
*G06N 3/08* (2006.01)
*G06K 9/62* (2006.01)

(52) U.S. Cl.
CPC ............ *G06K 9/66* (2013.01); *G06K 9/6256* (2013.01); *G06K 9/6267* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 9,892,344 B1 * | 2/2018 | Tran | G06K 9/66 |
| 2016/0148080 A1 | 5/2016 | Yoo | |
| 2016/0179434 A1 | 6/2016 | Herrero Abellanas | |
| 2017/0024634 A1 | 1/2017 | Miao | |
| 2017/0032285 A1 | 2/2017 | Sharma | |

FOREIGN PATENT DOCUMENTS

WO    2015157526    10/2015

OTHER PUBLICATIONS

"CS231n Convolutional Neural Networks for Visual Recognition"—waybackmachine web archive date of Feb. 8, 2015—pp. 1-10.
Agostinelli, F.—"Learning activation functions to improve deep neural networks"—ICLR 2015—Apr. 21, 2015—pp. 1-9.
Non-Final Office Action issued in U.S. Appl. No. 14/954,646 dated May 10, 2017.
Notice of Allowance issued in U.S. Appl. No. 14/954,646 dated Oct. 17, 2017.

* cited by examiner

*Primary Examiner* — Bernard Krasnic
(74) *Attorney, Agent, or Firm* — Hogan Lovells US, LLP (57) ABSTRACT

Tasks such as object classification from image data can take advantage of a deep learning process using convolutional neural networks. These networks can include a convolutional layer followed by an activation layer, or activation unit, among other potential layers. Improved accuracy can be obtained by using a generalized linear unit (GLU) as an activation unit in such a network, where a GLU is linear for both positive and negative inputs, and is defined by a positive slope, a negative slope, and a bias. These parameters can be learned for each channel or a block of channels, and stacking those types of activation units can further improve accuracy.

17 Claims, 7 Drawing Sheets

ACTIVATION LAYERS FOR DEEP LEARNING NETWORKS

This application is a continuation of allowed U.S. application Ser. No. 14/954,646, filed Nov. 30, 2015, entitled "ACTIVATION LAYERS FOR DEEP LEARNING NETWORKS," which is incorporated herein by reference for all purposes.

BACKGROUND

Users are increasingly utilizing electronic devices to obtain various types of information. For example, a user wanting to purchase a product might access an electronic marketplace in order to search the types of products offered through that marketplace. Unless the user knows an exact brand or style of product that the user wants, however, the user might have to search through hundreds or thousands of different products using various options to attempt to locate the type of product in which the user is interested. If the user is interested in a product of a specific type, the user might have no option but to sift through these results, potentially only being able to narrow the results by price, ratings, availability, or other such options. In some situations, a user interested in acquiring information about a product can capture an image of the product and submit the captured image to an object recognition system to obtain information associated with the product. However, conventional object recognition approaches may not be able to successfully and/or quickly identify objects. In either situation, the process can be time consuming and potentially frustrating for a user, which can result in the user not locating an item of interest and the marketplace not completing a transaction.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to identifying items using an electronic device. In particular, various embodiments provide for the improved recognition of items represented in image or other data using an improved deep learning network-based approach. Object recognition or classification can make use of various machine learning methods, and it is desirable to make these methods as accurate as possible. In at least some embodiments, generalized linear units (GLUs) can be used as activation units in order to improve accuracy over conventional approaches. Such deep learning approaches can be used with processes such as computer vision and object recognition, audio signal analysis, speech recognition, and item classification, among others.

A deep neural network consists of many layers, where each layer can have a large number of units, often referred to as "neurons." One variety, convolutional neural networks, or "nets," shows state of the art performance for many tasks in computer vision, such as image classification. In convolutional neural nets, the network consists of a repeating set of layers where the layers can consist of a convolutional layer followed by an activation layer or activation "function," and may include a pooling layer. At the top of the network there can be one or more fully connected layers, followed by a softmax layer if the network is being used for classification. The activation layers introduce non-linearity in to the network and are important for the performance of the net. Changing these layers can be critical to network accuracy. A number of different activation functions have been introduced, which have various effectiveness and accuracies. The performance of the nets can be improved by making them deeper, or including additional layers. There is a tradeoff, however, as an increase in layers makes the net harder to train.

Approaches in accordance with various embodiments utilize a more "general" form of rectified linear unit (ReLU) referred to herein as a generalized linear unit (GLU) to provide a new activation function. A GLU is linear for both positive and negative inputs. It is defined by three parameters, relating to a negative slope, a positive slope, and a bias. These parameters can be learned for each channel, or for a block of channels. Using such GLUs as the activation units provides superior accuracy over existing conventional approaches. Further, at least two GLU's can be stacked one after the other. One GLU can have parameters learned per channel and one GLU can have parameters learned per block of channels, whereby the stacking further improves the accuracy of the system.

Various other functions and advantages are described and suggested below as may be provided in accordance with the various embodiments.

Figure 1A:
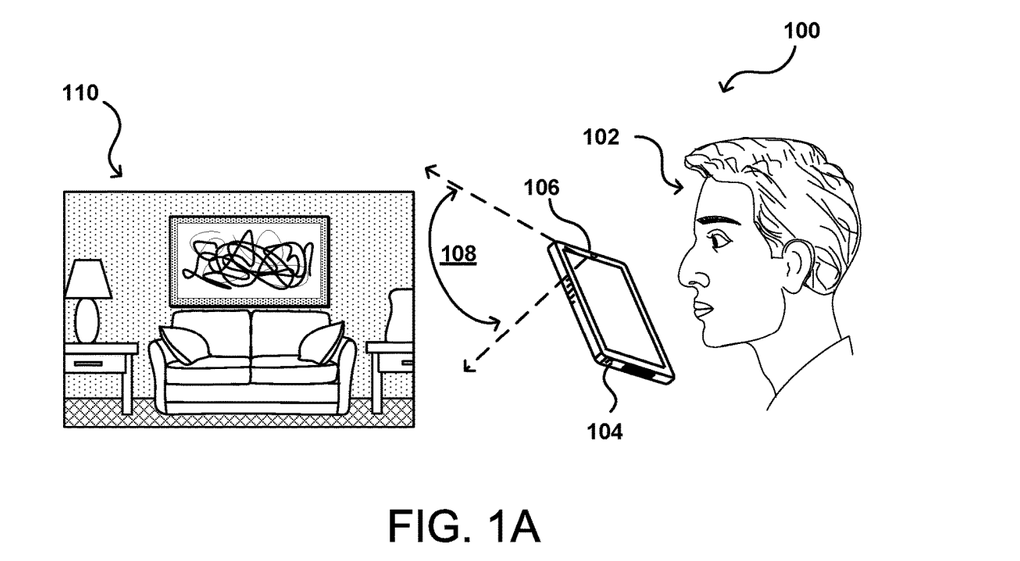
FIGS. 1A and 1B illustrate an example approach in which a user can attempt to capture an image in order to locate information about an item in accordance with various embodiments.
Figure 1B:
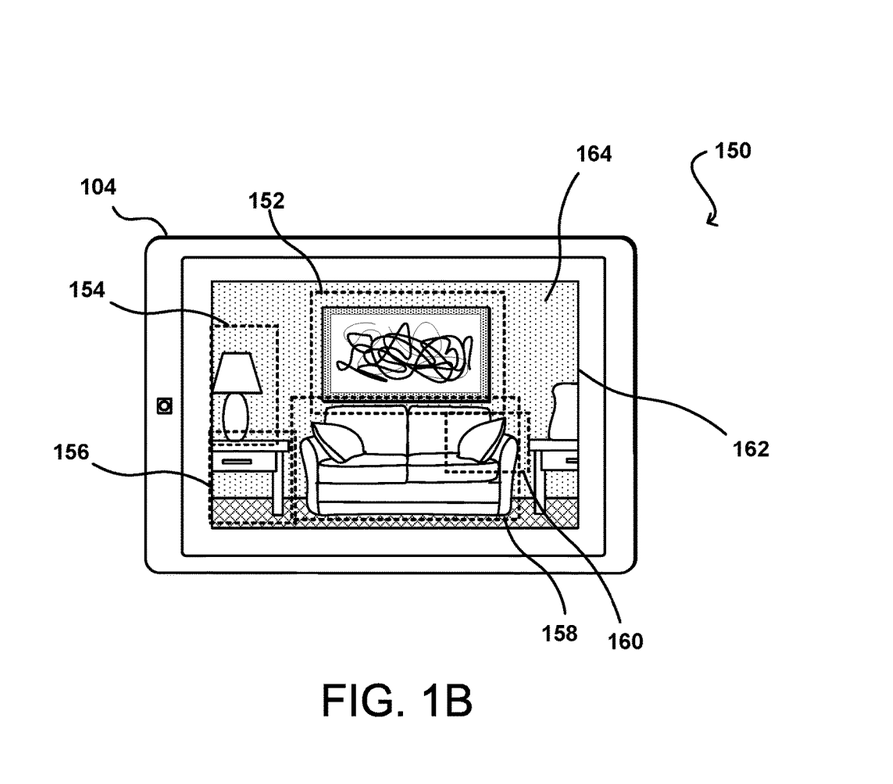

FIG. 1 illustrates an example situation 100 in which a user 102 is attempting to locate information for an item 112 in accordance with various embodiments. Although a portable computing device (e.g., a smart phone or tablet computer) is shown, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others. In this example, the computing device 104 has at least one camera 106 (or other image capture sensor or element) operable to perform functions such as image and/or video capture. Each camera may be, for example, a charge-coupled device (CCD), a motion detection sensor, or an infrared sensor, or can utilize another appropriate image capturing technology. In this example, the user can position the device such that one or more items of interest 112 are within a field of view 108 of at least one camera 106 on the computing device. The camera might capture video, such that a "live" view of the captured video information can be displayed on a display screen 152 of the computing device 104, as illustrated in the example situation 140 of FIG. 1B. In other embodiments, the camera might capture a still image 154 showing a representation of the item(s) of interest. In at least some embodiments, the image and/or a frame of the video can be analyzed, such as by analyzing on the device or uploading across a network to a service for analyzing image content.

Unfortunately, attempting to recognize an item, particularly a set of items, based on a query image such as that illustrated in FIG. 1B can be difficult and extremely resource intensive. For example, it can be difficult to determine which portion of the image represents an item of interest to the user. For instance, in the example image 154 there are lamps, 144 vases, end tables 146, pillows 150, picture frames 142, a couch 148, as well as other items represented in the image. Although a user might know that the couch is the item of interest, it can be significantly more difficult for a computer vision (or other such) algorithm to analyze the image, determine portions that correspond to different items, identify the portion corresponding to the specific item, and then segment that portion from the background or remaining portion of the image. The process will also have to analyze the segmented image portion using an object recognition or computer vision process, for example, in order to attempt to recognize and/or classify the type of object. Further, even if the item can be successfully segmented from the image and identified, a user wanting to purchase a product might have to access an electronic marketplace in order to search the types of products offered through that marketplace to find the item. Such a process can be time consuming and potentially frustrating for a user, which can result in the user not locating an item of interest and the marketplace not completing a transaction. Further still, conventional object recognition approaches may not be able to successfully and/or quickly identify objects, which can potentially be frustrating for a user.

Similar issues arise when attempting to perform audio recognition, for example, wherein a user's speech may have to be segmented or separated from background or other noise. The user's speech then has to be analyzed to attempt to determine or recognize words or phrases spoken by the user. This can include, for example, comparing the detected speech against an electronic catalog of words or phrases, among other such options.

Accordingly, approaches in accordance with the various embodiments provide for the improved recognition of objects represented in image data by using an improved deep learning network-based approach. In at least some of these embodiments, generalized linear units can be used as activation layers in order to improve accuracy over conventional approaches.

In accordance with various embodiments, item classification can be implemented using a machine learning algorithm to classify a patch, segment, or other region(s) of interest in an image. Examples of machine learning include principal component analysis (PCA), neural networks, support vector machines (SVM), inductive learning, adaptive boosting, and deep learning, among others. In PCA, eigenvectors are computed on a training set of images known to include objects corresponding to a particular classification to determine the covariance matrix of the training set. Training images known to include the classified are projected onto "a classified object subspace" and clustered. The distance between a region of each training image known to include the classified object and the classified object subspace is computed for the training image. The distance from the classified object subspace is used as a measure of whether a query image includes a classified object, and the distances from the classified object subspace form a "classified object map." An object can be detected to be presented in a query image from the local minima of the "classified object map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include the multilayer neural network, the auto-associative neural network, the probabilistic decision-based neural network (PDBNN), and the sparse network of winnows (SNoW).

Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Naïve Bayes classifier estimates the local appearance and position of object at multiple resolutions. At each scale, a training image is decomposed into sub-regions and the sub-regions are further decomposed according to space, frequency, and orientation. The statistics of each projected sub-region are estimated from the projected samples to learn the joint distribution of object and position. An object is determined to be within an image if the likelihood ratio is greater than the ratio of prior probabilities.

Adaptive boosting is a machine learning algorithm which finds a highly accurate hypothesis (i.e., low error rate) from a combination of many "weak" hypotheses (i.e., substantial error rate). Given a data set comprising examples within a class and not within the class and weights based on the difficulty of classifying an example and a weak set of classifiers, adaptive boosting generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an adaptive boosting-based approach is the Viola-Jones detector. Viola-Jones scans a sub-window of an input image using features consisting of Haar-like features, black and white boxlets that are weighted during training, and resized over several passes of the detector. A sub-window is determined to be a candidate of a classified object if the difference of the sum of pixels within two regions meets a threshold $\theta$ for a Haar-like feature determined during the training stage. Viola-Jones further utilizes the concept of attentional cascading which observes that within an image, most sub-windows are not instances of the classified object. Thus, smaller and more efficient classifiers can be used to reject sub-windows unlikely to be the classified object at earlier stages of the detector while keeping almost all of the positive instances.

More complex classifiers are used at later stages to examine candidates that have not been rejected as candidates of the classified object.

In accordance with various embodiments, deep learning involves modeling high-level abstractions in data using multiple non-linear transformations. Deep learning techniques are based on the premise that images can be represented in many ways but, from exemplars, certain representations can make it easier to learn tasks of interest, such as object classification of an object represented in an image. Deep learning techniques include deep neural networks, convolutional deep neural networks, and deep belief networks. As will be apparent to persons of reasonable skill in the art, any number or combination of classification approaches can be applied herein. In this example, the image analysis module implements a deep neural network, such as a convolutional neural network, and can be trained to classify different categories. The categories can correspond to products offered through an electronic marketplace.

As would be understood to one skilled in the art, neural networks consist of multiple layers of neuron collections which look at portions or regions of the input image, called receptive fields. A neuron (or unit) can be a mathematical function. Neurons are the constitutive units in an artificial neural network. The neuron receives one or more inputs such as portions of an image and sums them to produce an output. Usually the sums of each node are weighted, and the sum is passed through a non-linear function known as an activation function or transfer function. The transfer functions usually have a sigmoid shape, but they may also take the form of other non-linear functions, piecewise linear functions, or step functions. They are also often monotonically increasing, continuous, and bounded.

Convolutional networks may include local or global pooling layers, which combine the outputs of neuron collections. They also consist of various combinations of convolutional layers and fully-connected layers, with point-wise nonlinearity applied at the end of or after each layer. The results of the neuron collections are then tiled so that they overlap to obtain a better representation of the original image and this process is repeated for each layer.

Convolutional layers, for example, have well defined receptive fields. In accordance with various embodiments, these fields can operate on a specific region of the image, while the layers operate on the entire image. The size of the receptive field is a property of the units that make up the layer to which the region is associated with and not a property of the convolutional network. As such, the size of the receptive field is independent of the size of the input image. In this way, if the input image were to grow in size, then the layer would also grow by adding more units of the same type at its edges. Further, as is understood in the art, a notion of location in the original image is retained for convolutional layers throughout the convolutional network. Each particular unit has a receptive field that is defined in shape and size and resides at a specific location in the original image, and if the size of the input is increased, each output can be associated to a specific proposal region.

In each convolutional layer, the convolutional network uses a shared weight, and each layer will compute the output of neurons that are connected to local regions (i.e., receptive fields) in the input, where each neuron computes a dot product between their weights and the region (i.e., receptive field) they are connected to in the input. In this way, each neuron looks at a specific region (i.e., receptive field) of the image and outputs one number: the dot product between its weights and the pixel values of in its region (i.e., receptive field). Fully-connected layers, for example, operate on the entire input and the receptive field size is defined as the entire image. Regions of the image feed into all units of the layer.

There are several types of layers of neurons in a neural network. As mentioned, in a fully connected layer every unit of its input is connected to every unit of the output. This layer is therefore very dense and often contains a very large number of parameters. Effective regularization techniques such as drop-out are used for such layers during the training process. To deal with images, which have very high dimensions, convolutional networks introduced convolutional and pooling layers. A convolution layer differs from a fully connected layer primarily in weight sharing. Weight sharing drives down the number of parameters in a layer significantly, making the network more efficient and helping to avoid over-fitting.

Figure 2A:
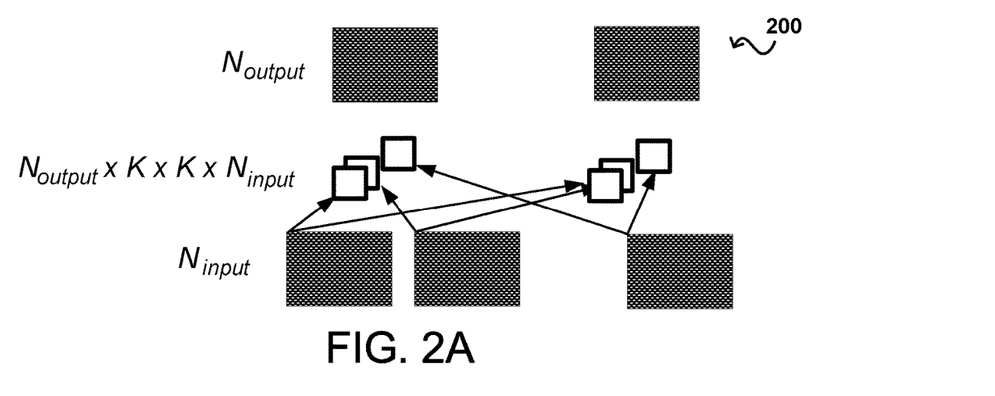
FIGS. 2A, 2B, and 2C illustrate example convolutional layers that can be utilized in accordance with various embodiments.

As depicted in the example 200 of FIG. 2A, an input to a convolutional layer is typically a set of two-dimensional (2D) feature maps. Each of these maps is convolved with a 2D channel in a three-dimensional (3D) kernel to generate a 2D output feature map. The number of 3D kernels can determine the number of output maps. In FIG. 2A, $N_{output}$ and $N_{input}$ are the number of output and input feature maps, respectively, and K×K is the shape of one channel of the kernels. The kernel weights are shared among all points in an input feature map (a channel), and the information is combined across all channels to generate an output map.

Figure 2B:
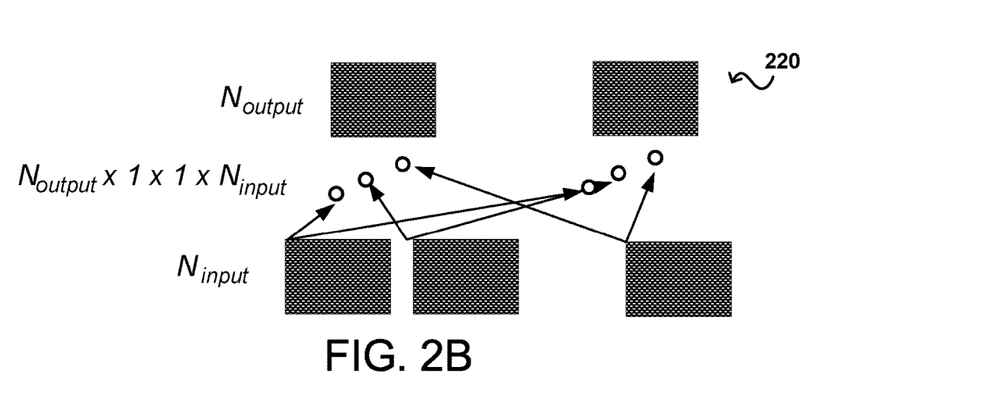

FIG. 2B illustrates an example 1×1 convolutional layer 220. A 1×1 convolutional layer is a special case of a convolution layer that can make the convolution kernel more powerful by concatenating a series of 1×1 convolution operations after the traditional operations. Since such an approach is efficient, it becomes a handy mechanism for dimension reduction as well, such as by converting $N_{input}$ maps to $N_{output}$ ($<<N_{input}$) maps. In at least some embodiments a 1×1 convolution layer can be used to form different columns of a block.

Figure 2C:
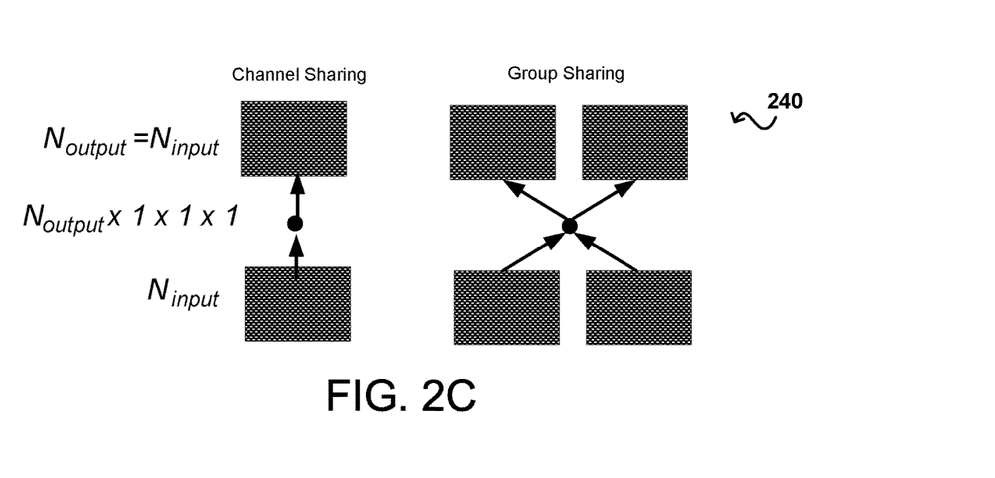

When generalized linear units (GLUs) are used, the mapping from input feature maps to output maps is one to one. However, instead of learning an activation function per receptive location, or pixel, an activation function can be learned for a channel or for a group of channels. This follows the sharing principle that makes convolution layers effective as discussed elsewhere herein. FIG. 2C illustrates an example per-channel convolution 240 with sharing within a channel shown on the left and sharing between channels shown on the right. Unlike conventional convolution layers, the outputs here are not combined across input channels. The parameters are shared, but the activation is still a point-wise transformation.

Figure 3A:
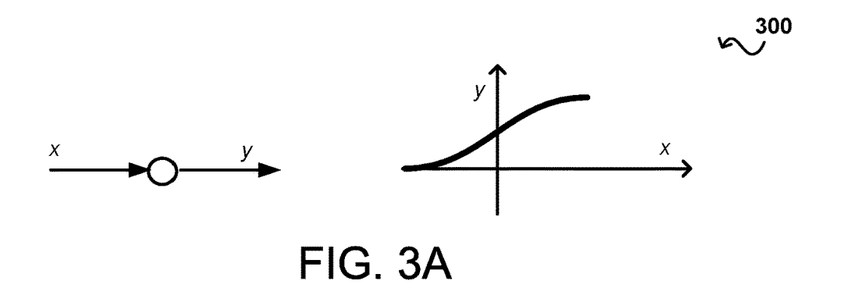
FIGS. 3A, 3B, 3C, and 3D illustrate example activations that can be utilized in accordance with various embodiments.

As mentioned, the activation functions are one of the most important features of a neural network, as they transform the input to a neuron into its output using non-linear transformations. It is this non-linearity that enables the different feature space transformation across layers of a neural network, making them powerful at classification or regression tasks. The activation functions are used both in fully connected layers and in convolutional layers. FIG. 3A illustrates an example 300 of a traditional sigmoid-based activation function, given by:

$$y = \frac{1}{1+e^{-x}}$$

This activation function is continuous, bounded, and was widely used as the activation function in the early days for (shallow) nets. However, this activation function is very hard to train even for a network that is not very deep due to a number of issues, notably gradient saturation.

Figure 3B:
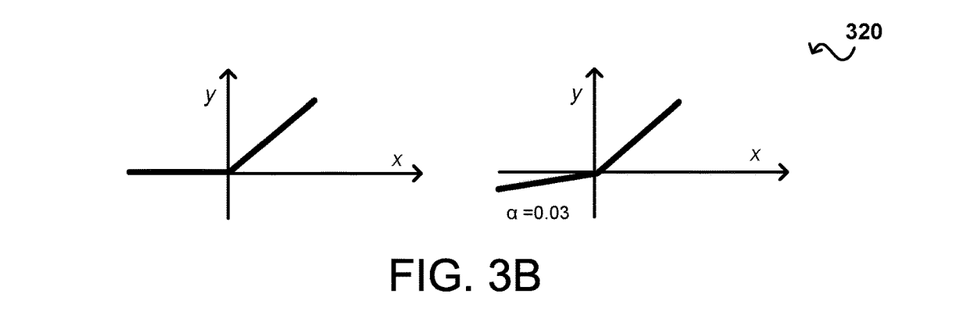
Figure 3C:
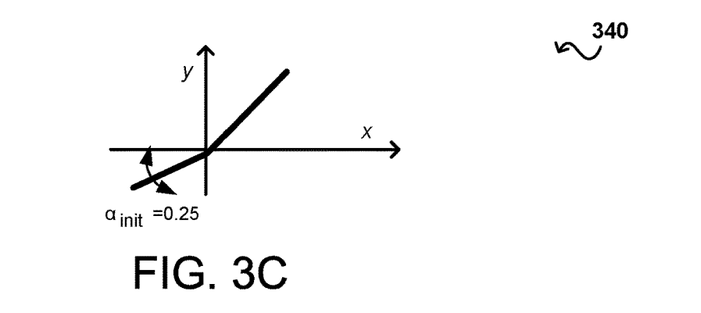

FIG. 3B illustrates an example rectified linear unit (ReLU) activation function 320 that can be utilized in accordance with various embodiments. The example includes a ReLU on the left and its leaky variant on the right. The slope for the negative portion of the leaky version is often a small positive number. The ReLU is one of the most important advances in deep neural networks, as it helps the training of a deep neural network converge more easily. It has a simple form as depicted in FIG. 3B, with the leaky version retaining some small slope on the negative part, which has been shown to improve network's performance. It should be noted that the ReLU and Leaky ReLU are identical across the network. Another variant is randomized leaky rectified linear units, where the a parameter is randomly initialized but fixed during training. This had been shown to bring further improvement on at least some datasets. FIG. 3C illustrates an example parameterized leaky ReLU 340 that can be utilized in accordance with various embodiments. This unit extends ReLU by adding a learnable parameter to the negative part, its slope. This particular unit has been shown to be very useful in training very deep networks.

Figure 3D:
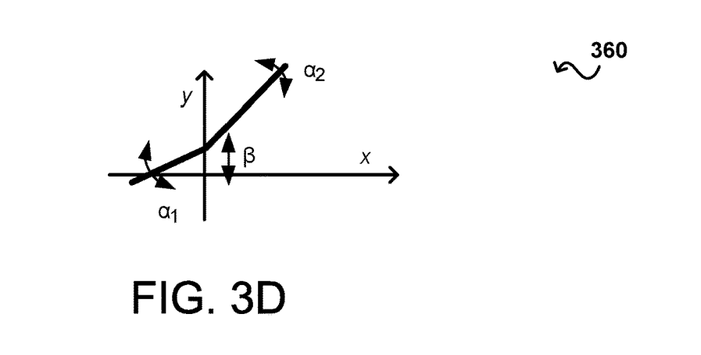

FIG. 3D illustrates an example generalized linear unit (GLU) activation function 360 that can be utilized in accordance with various embodiments. The activation function can be made even more powerful by parameterizing not only the negative slope but also the positive slope and its bias. Each GLU has three corresponding learnable parameters, given by $\alpha_1$, $\alpha_2$, and $\beta$ in this example. Below are the details of the derivation of forward (activation) computation and backward propagation of gradients. For forward transformation of input x:

$$y_i^c = \begin{cases} a_1^c * x_i + \beta^c, & x_i \leq 0 \\ a_2^c * x_i + \beta^c, & x_i \leq 0 \end{cases}$$

where i is the index of the $i^{th}$ receptive location in a feature map, $x_i$ and $y_i$ are respectively the input and output corresponding to that location, and c is the group index. As discussed elsewhere herein, a group can consist of one or more channels and every point in the same group can share the same set of parameters ($\alpha_1$, $\alpha_2$, $\beta$).

If L denotes the loss on a single mini-batch, and $N_c$ denotes the number of receptive locations for the groups c, then the back-propagation of gradients for GLUs can be calculated in at least some embodiments as follows:

$$\frac{\partial L}{\partial \alpha_1^c} = \sum_{i=1}^{N_c} \frac{\partial L}{\partial y_i^c} \frac{\partial y_i^c}{\partial \alpha_1^c} = \sum_{i=1}^{N_c} \frac{\partial L}{\partial y_i^c} x_i [x_i \leq 0]$$

$$\frac{\partial L}{\partial \alpha_2^c} = \sum_{i=1}^{N_c} \frac{\partial L}{\partial y_i^c} x_i [x_i > 0]$$

$$\frac{\partial L}{\partial \beta^c} = \sum_{i=1}^{N_c} \frac{\partial L}{\partial y_i^c} \frac{\partial y_i^c}{\partial \beta^c} = \sum_{i=1}^{N_c} \frac{\partial L}{\partial y_i^c}$$

$$\frac{\partial L}{\partial x_1^c} = \frac{\partial L}{\partial y_i^c} \frac{\partial y_i^c}{\partial x_1^c} = \frac{\partial L}{\partial y_i^c} (a_1^c [x_i \leq 0] + a_2^c [x_i > 0])$$

During training in one embodiment, $\alpha_1$ and $\alpha_2$ are kept non-negative and initialized to 0.25 and 1.0 respectively. Weight decaying is not applied to these parameters. Such parameterization improves both the training process and network accuracy.

Various other related activation functions may not work as well as GLUs in at least some instances, but can be used as well within the scope of the various embodiments. Relevant to GLUs, two such functions are described that both transform the neuron's input using piecewise linear functions. A max-out activation function is a type of activation wherein each unit is split into multiple learnable linear units and the final output is the maximum value across the output of all these units. One layer of max-out can approximate a convex downward function, not the concave upward. To approximate a GLU, at least two layers of max-out are needed. The number of parameters and computation time would therefore almost double as well in at least some embodiments. For at least these reasons, it may be desirable to implement direct parameterization using GLUs over combining linear functions using a max operator in at least some embodiments.

Another related activation unit is an adaptive piecewise linear unit, as may be given by:

$$y_i(x) \max(0, x) + \sum_{s=1}^{S} a_i^s \max(0, -x + b_i^s)$$

Here the activation function is also constructed using a number of linear functions. Even though S, a hyper parameter, can be set to be an arbitrarily high number, most of the learned functions are approximately two-piece. Unlike GLUs, the right-most part of this scheme has a slope equal to 1.0. This can impose some restrictions on what can be modeled in the corresponding domain. Similar to max-out, this approach can use the maximum functions, and therefore can be less efficient than GLUs as discussed above. Furthermore, higher order activation can make one unit powerful, but can also be less general and might affect the entire network performance both during training time and during testing time. Therefore, it can be desirable in at least some embodiments to keep GLUs as two-piece functions.

As further information regarding the GLUs and parameter sharing approaches described above, taking a GLU (1×1) and fixing all the parameters, except the negative slope, gives a PReLU. As discussed elsewhere herein, a hierarchy of weight sharing can be applied first at channel level then across a group of channels and finally at the block level. The performance using GLUs as discussed herein was unexpected. There was no indication that such an approach would improve performance over the variety of other possible approaches. Deep networks are very expensive to run computationally. It might take 30 full days on a single GPU to train such a network. Multiple GPUs can be utilized, but the GPUs themselves are expensive. Since there was no guarantee that a GLU would work, most people would not attempt to try such an approach due at least in part to the great expense. There are millions of possible parameters and no one can predict how well something is going to work. The odds were against a GLU-based approach working, to the point where no one else had taken the chance.

Figure 4:
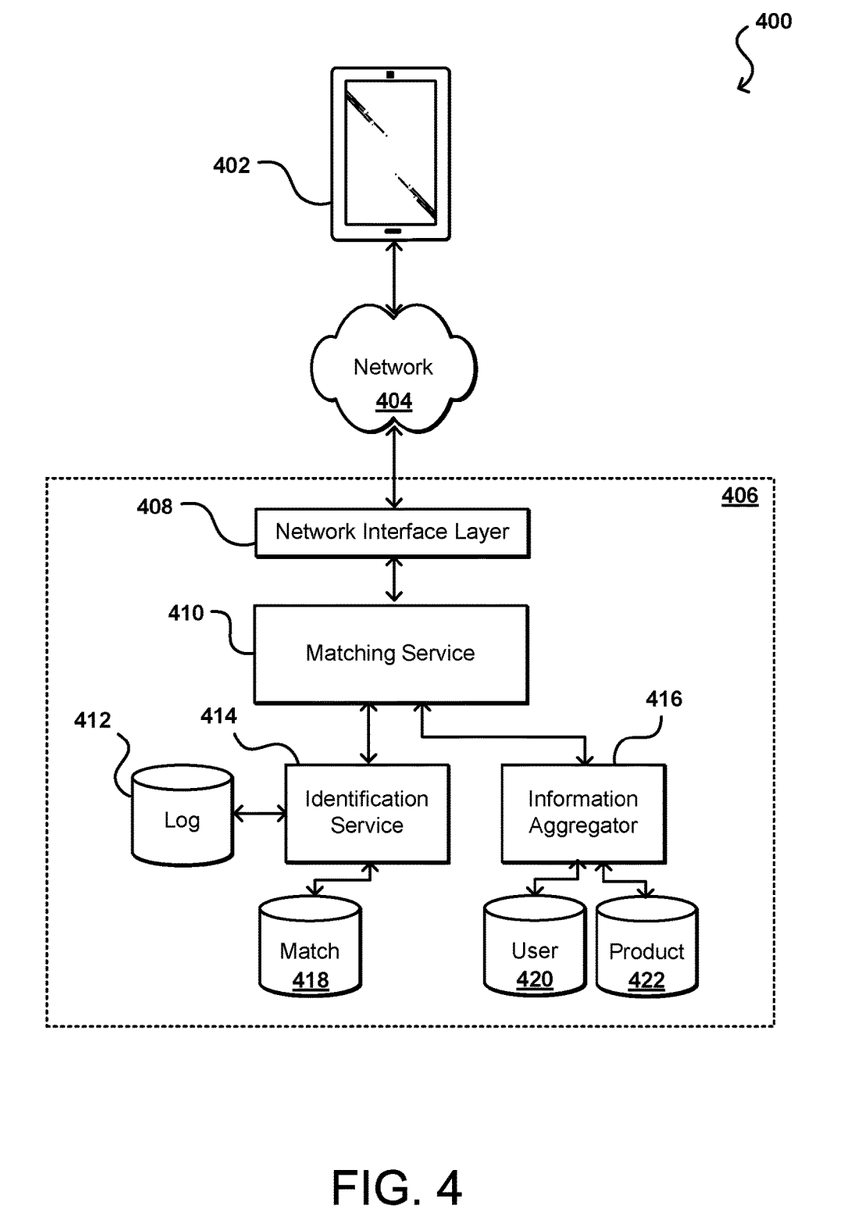
FIG. 4 illustrates example system for identifying items and providing information about those items that can be utilized in accordance with various embodiments.

FIG. 4 illustrates an example environment 400 that can be used to provide for object recognition in which information can be submitted by a client device in order to attempt to obtain information for matching items as a set of search results or other such content. In this example, a user is able to capture image data of a live camera view of one or more objects using a computing device 402. In various embodiments, the image data can be captured image data (e.g., still images and/or video data) or downloaded image data. An application executing on the computing device (or at least in communication with the computing device) can analyze the image data of the live camera view to recognize the objects represented in the image data as well as determine a location or region of the image that includes the representation of the objects.

The computing device can send at least a portion of information across at least one appropriate network 404, such as may include the Internet, a local area network (LAN), a cellular network, and the like. The request can be sent to an appropriate content provider 406, as may provide one or more services, systems, or applications for processing such requests.

In this example, the request is received to a network interface layer 408 of the content provider 406. The network interface layer can include any appropriate components known or used to receive requests from across a network, such as may include one or more application programming interfaces (APIs) or other such interfaces for receiving such requests. The network interface layer 408 might be owned and operated by the provider, or leveraged by the provider as part of a shared resource or "cloud" offering. The network interface layer can receive and analyze the request, and cause at least a portion of the information in the request to be directed to an appropriate system or service, such as a matching service 410 as illustrated in FIG. 4. A matching service in this example includes components operable to receive information for a recognized object, analyze the information, and return information relating to people, products, places, or things that are determined to match the information within at least an acceptable amount of deviation, within an allowable matching threshold, etc.

The matching service 410 in this example can cause information to be sent to at least one identification service 414, device, system, or module that is operable to analyze the information and attempt to locate one or more matches. In at least some embodiments, an identification service 414 will process the received data, such as to extract specific pattern and/or color features or values, then compare the processed data against data stored in a matching data store 418 or other such location. The data in an image matching data store 418 might be indexed and/or processed to facilitate with matching, as is known for such purposes.

The matching service 410 can receive information from each contacted identification service 414 as to whether one or more matches could be found with at least a threshold level of confidence, for example, and can receive any appropriate information for a located potential match. The information from each identification service can be analyzed and/or processed by one or more applications of the matching service, such as to determine data useful in obtaining information for each of the potential matches to provide to the user. For example, a matching service might receive bar codes, product identifiers, or any other types of data from the identification service(s), and might process that data to be provided to a service such as an information aggregator service 416 that is capable of locating descriptions or other content related to the located potential matches.

In at least some embodiments, an information aggregator might be associated with an entity that provides an electronic marketplace, or otherwise provides items or content for consumption (e.g., purchase, rent, lease, or download) by various customers. Although products and electronic commerce are presented in this and other examples presented, it should be understood that these are merely examples and that approaches presented in the present disclosure can relate to any appropriate types of objects or information as discussed and suggested elsewhere herein. In such an instance, the information aggregator service 416 can utilize the aggregated data from the matching service 410 to attempt to locate products, in a product data store 422 or other such location, which are offered through the marketplace and that match, or are otherwise related to, the potential match information. For example, if the identification service identifies a matching object, the information aggregator can attempt to determine whether objects of that type are offered through the marketplace, or at least for which information is available through the marketplace. In at least some embodiments, the information aggregator can utilize one or more suggestion algorithms or other such approaches to attempt to determine related elements that might be of interest based on the determined matches. In some embodiments, the information aggregator can return various types of data (or metadata) to the matching service, as may include item description, availability, reviews, and the like. In other embodiments, the information aggregator might instead return information such as a product identifier, uniform resource locator (URL), or other such digital entity enabling a browser or other interface on the client device 402 to obtain information for one or more products, etc. The information aggregator can also utilize the aggregated data to obtain various other types of data as well. Information for located matches also can be stored in a user data store 420 of other such location, which can be used to assist in determining future potential matches or suggestions that might be of interest to the user. Various other types of information can be returned as well within the scope of the various embodiments.

The matching service 410 can bundle at least a portion of the information for the potential matches to send to the client as part of one or more messages or responses to the original request. In some embodiments, the information from the identification services might arrive at different times, as different types of information might take longer to analyze, etc. In these cases, the matching service might send multiple messages to the client device as the information becomes available. The potential matches located by the various identification services can be written to a log data store 412 or other such location in order to assist with future matches or suggestions, as well as to help rate a performance of a given identification service. As should be understood, each service can include one or more computing components, such as at least one server, as well as other components known for providing services, as may include one or more APIs, data storage, and other appropriate hardware and software components. It should be understood that, although the identification services are shown to be part of the provider environment 406 in FIG. 4, that one or more of these identification services might be operated by third parties that offer these services to the provider.

Figure 5:
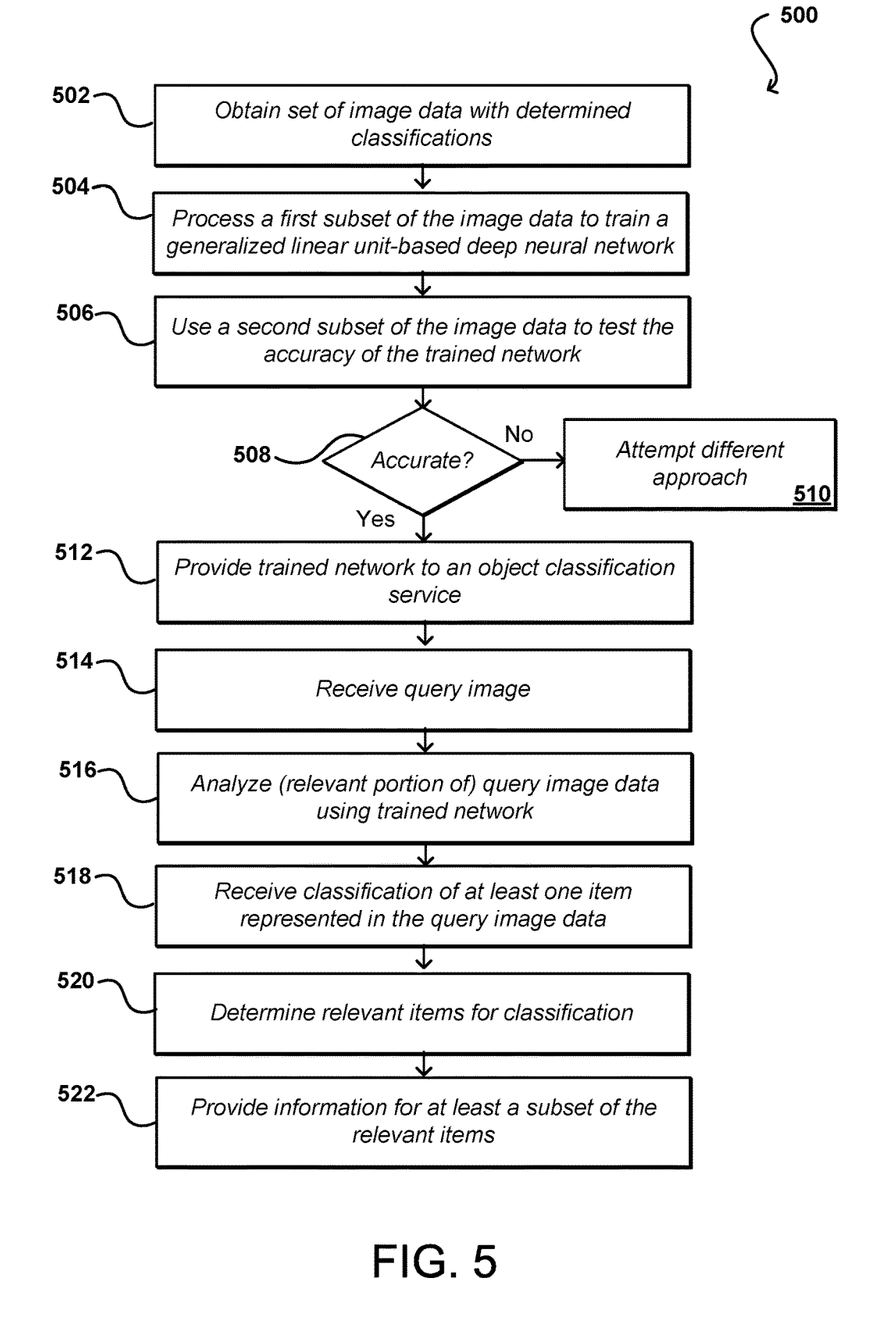
FIG. 5 illustrates an example process for training and utilizing a deep learning process for object classification that can be utilized in accordance with various embodiments.

FIG. 5 illustrates an example process 500 for using a convolutional neural network to classify objects that can be utilized in accordance with various embodiments. It should be understood that there can be additional, fewer, or alternative steps performed in similar or alternative orders, or in parallel, within the scope of the various embodiments unless otherwise stated. In this example, a set of image data, such as may be referred to as an image net in conventional training approaches, is obtained 502, where that image data can include representations of objects have existing classifications. A first subset of the image net can be processed 504 using a generalized linear unit-based deep neural network in order to train the network. A second subset of the image data set can be used to test 506 the network after training. This can include, for example, classifying the images of the testing portion using the network and comparing the classifications to the known values and generating an accuracy score. A determination can be made 508 as to whether the accuracy of the trained network at least meets a minimum accuracy score or threshold. If not, a different approach can be attempted 510, such as by trying a different network or activation unit or performing further training of the model, among other such options. If the accuracy of the trained network at least meets the minimum accuracy threshold, such as at least 50%, 75%, or 95% accurate in some embodiments, the network can be provided 512 to an object classification service (or other system, device, or component) for purposes of classifying items represented in images.

Subsequently, a query image can be received 514, such as from a client device associated with a user. Various other images can be received from other sources as well, and the query image can include image data extracted from a video file, video stream, set of images, etc. As mentioned, in other embodiments other types of data can be received and analyzed as well within the scope of the various embodiments. Any pre-processing of the image can be performed as desired, as may include color quantization, noise removal, background removal, item segmentation, and the like. The appropriate image data can be analyzed 516 using the trained network as discussed elsewhere herein. A classification of an item represented in the image data can be received 518 from the trained network, and relevant items for that classification can be determined 520. Information for at least a portion of the relevant items can then be provided 522 in response to the request, such as may take the form of a set of search results or recommendations in at least some embodiments. Various other groupings of content and types of displays can take advantage of such classification as well within the scope of the various embodiments.

In one example, a dataset was used that included 1.3 million images of 1,000 different categories. The network architectures used included multi-column and multi-block architectures, referred to as GoogleNet or GNet. The networks were trained using standard SGD without any warm up or special expansion techniques. With respect to the performance evaluation, validation accuracy was determined on a set of around 60,000 validation images. The following architectures were compared:
  i. GNet+ReLU: GNet with standard activation unit, ReLUs
  ii. GNet+PReLU: GNet where ReLUs are replaced by PReLUs (parametric ReLUs)
  iii. GNet+GLU: ReLUs are replaced with GLUs
  iv. GNet+Double layers of GLUs: Two consecutive layers of GLUs are used. The first one is for weight sharing within channel. The second one is for weight sharing with a group of 8 channels.

For 1.6 million iterations (~43 epochs) and a batch size of 128, the accuracy on validation sets were as follows

|  | ReLU | PReLU (i) | GLU (ii) | 2GLUs (iii) |
|---|---|---|---|---|
| Top-1 | 64.4% | 67.2% | 69.2% | 70% |
| Top-5 | 86.1% | 87.8% | 89.1% | 89.4% |

As can be seen from the above results, in terms of the network performance,
  Plain GNet<GNet+PReLU<GNet+GLU<GNet+Double GLU This experiment shows the benefit of using GLU units in deep convolutional neural nets.

Figure 6:
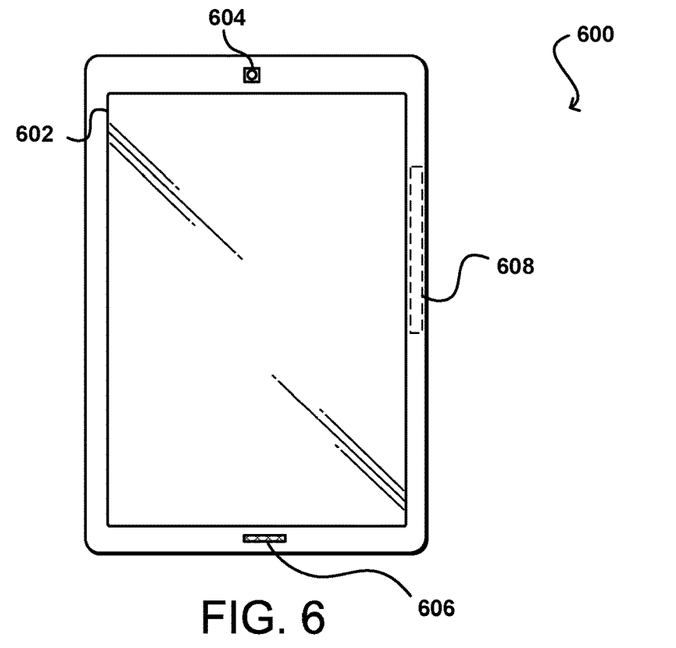
FIG. 6 illustrates an example device that can be used to implement aspects of the various embodiments.

FIG. 6 illustrates an example electronic user device 600 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 600 has a display screen 602 on the front side, which under normal operation will display information to a user facing the display screen (e.g., on the same side of the computing device as the display screen). The computing device in this example includes at least one camera 604 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 600 also includes at least one microphone 606 or other audio capture device capable of capturing audio data, such as words or commands spoken by a user of the device. In this example, a microphone 606 is placed on the same side of the device as the display screen 602, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 600 also includes at least one orientation sensor 608, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 7:
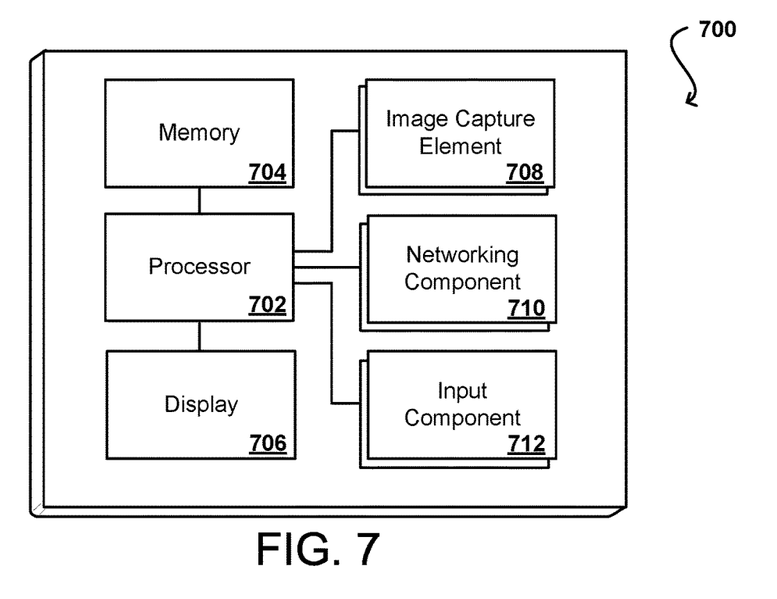
FIG. 7 illustrates example components of a client device such as that illustrated in FIG. 6.

FIG. 7 illustrates a logical arrangement of a set of general components of an example computing device 700 such as the device 600 described with respect to FIG. 6. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one image capture element 708 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component, such as a mono or stereo microphone or microphone array, operable to capture audio information from at least one primary direction. A microphone can be a uni- or omni-directional microphone as known for such devices.

In some embodiments, the computing device 700 of FIG. 7 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input component 712 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 700 also can include at least one orientation or motion sensor or component 710. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 702, whereby the device can perform any of a number of actions described or suggested herein.

As an example, a computing device such as that described with respect to FIG. 6 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 8:
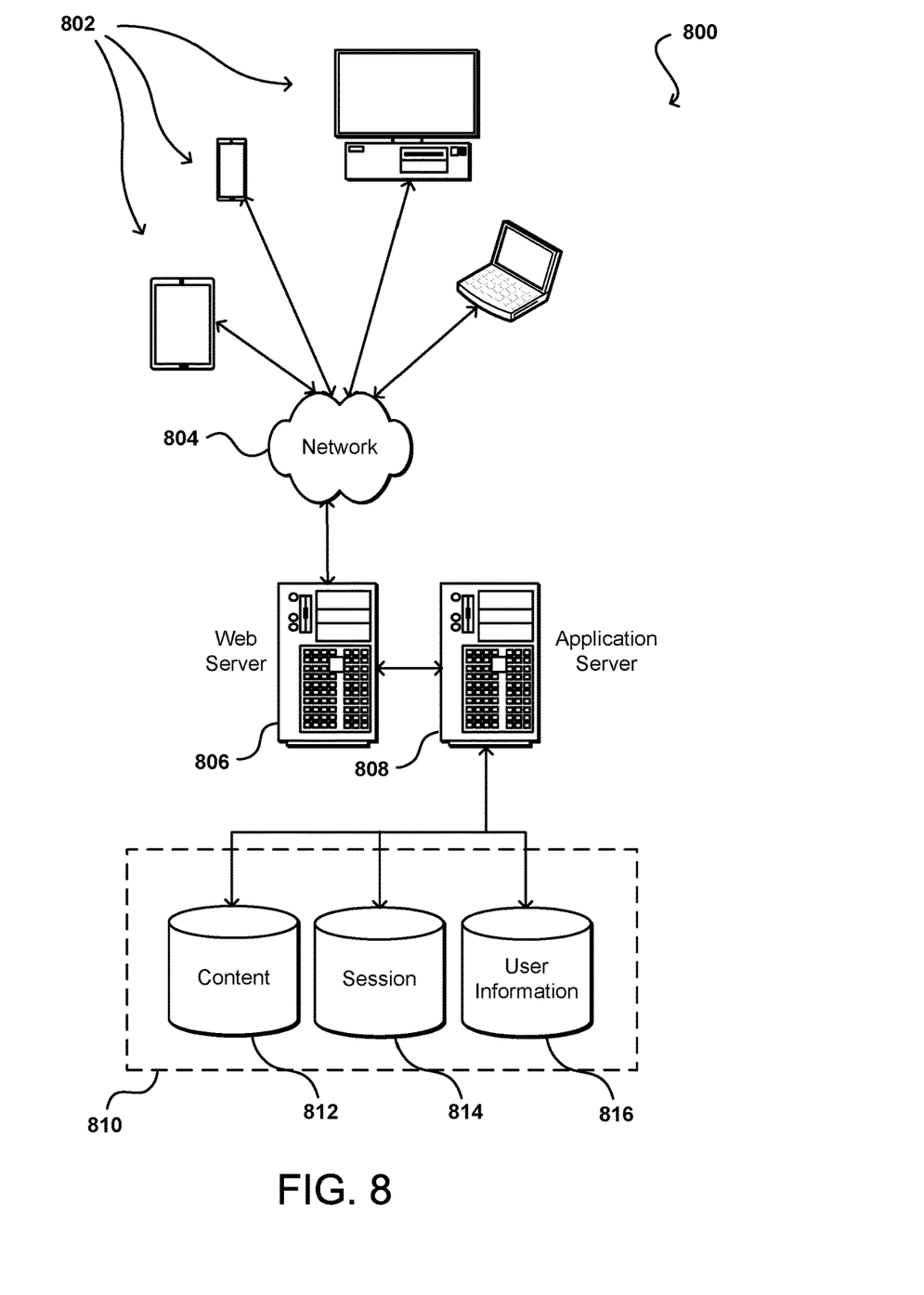
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 802. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including non-transitory computer-readable storage media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   training a convolutional neural network using a set of a training data, the training data including instances of data with determined classifications;
   receiving a query from a client device associated with a user;
   processing the query using the trained convolutional neural network to determine a classification of a data object represented in the query, the trained convolutional neural network containing at least one convolutional layer and at least one activation layer, the at least one activation layer including a generalized linear unit, the generalized linear unit having a functional form described using a pair of straight lines with three parameters including a first slope in a positive region, a second slope in a negative region, and an offset applied to the first slope and the second slope, the three parameters learnable over at least one input channel;
   determining a set of features corresponding to the classification; and
   providing, to the client device, information for at least a subset of the set of features.

2. The computer-implemented method of claim 1, wherein the first slope is associated with positive inputs and the second slope is associated with negative inputs.

3. The computer-implemented method of claim 1, claim wherein a first activation layer with the three parameters learnable over a single channel is stacked with a second activation layer with the three parameters learnable over a block of input channels.

4. A computer-implemented method, comprising:
   training a convolutional neural network using a set of a training data, the training data including instances of data objects with determined classifications;
   receiving a query;
   processing the query using the trained convolutional neural network to determine a classification of a data segment represented in the query, the trained convolutional neural network containing at least one convolutional layer and at least one activation layer, the at least one activation layer including a generalized linear unit (GLU), the GLU having three parameters including a first slope in a positive region, a second slope in a negative region, and an offset applied to the first slope and the second slope, the three parameters learnable over at least one input channel;
   determining a set of data segments corresponding to the classification; and
   providing, to a client device, information for at least a subset of the set of data segments.

5. The computer-implemented method of claim 4, further comprising:
   measuring accuracy of the trained convolutional neural network by classifying data objects in a test set.

6. The computer-implemented method of claim 4, wherein the GLU is linear for positive inputs and negative inputs.

7. The computer-implemented method of claim 4, wherein the GLU further includes at least one of a pooling layer, a fully connected layer, or a softmax layer.

8. The computer-implemented method of claim 4, wherein the first slope is associated with positive inputs and the second slope is associated with negative inputs.

9. The computer-implemented method of claim 4, wherein the query comprises an image, an audio sample, a text input, or a combination thereof.

10. The computer-implemented method of claim 9, wherein a first activation layer with the three parameters learnable over a single channel is stacked with a second activation layer with the three parameters learnable over a block of input channels.

11. A system, comprising:
    at least one processor; and
    memory including instructions that, when executed by the at least one processor, cause the system to:
       train a convolutional neural network using a set of a training data, the training data including instances of data with determined classifications;
       receive query data;

process the query data using the trained convolutional neural network to determine a classification of at least a portion of the query data, the trained convolutional neural network containing at least one convolutional layer and at least one activation layer, the at least one activation layer including a generalized linear unit (GLU), the GLU having three parameters including a first slope in a positive region, a second slope in a negative region, and an offset applied to the first slope and the second slope, the three parameters learnable over at least one input channel;

determine a set of data objects corresponding to the classification; and provide, in response to a request, information for at least a subset of the set of data objects.

12. The system of claim 11, wherein the query data is classified using at least one of a computer vision process, an object recognition process, an audio signal analysis process, a speech recognition process, or an item classification process utilizing the trained convolutional neural network.

13. The system of claim 11, wherein the instructions when executed further cause the system to:

measure accuracy of the trained convolutional neural network after the training by classifying data in a test set.

14. The system of claim 11, wherein the GLU further includes at least one of a pooling layer, a fully connected layer, or a softmax layer.

15. The system of claim 11, wherein the first slope is associated with positive inputs and the second slope is associated with negative inputs.

16. The system of claim 11, wherein a first activation layer with the three parameters learnable over a single channel is stacked with a second activation layer with the three parameters learnable over a block of input channels.

17. The system of claim 11, wherein the GLU is linear for both positive and negative inputs.

* * * * *